US006934149B2

(12) United States Patent
Chen

(10) Patent No.: US 6,934,149 B2
(45) Date of Patent: Aug. 23, 2005

(54) MODULAR AUDIO-VISUAL DEVICE

(76) Inventor: Gino Chen, No. 228, Sec. 3, Chung Ching N. Rd., Taipei (TW)

( * ) Notice: Subject to any disclaimer, the term of this patent is extended or adjusted under 35 U.S.C. 154(b) by 31 days.

(21) Appl. No.: 10/748,265

(22) Filed: Dec. 31, 2003

(65) Prior Publication Data

US 2005/0141183 A1 Jun. 30, 2005

(51) Int. Cl.[7] .............................................. G06F 1/16
(52) U.S. Cl. ...................... 361/683; 248/924; 348/794
(58) Field of Search ............................... 361/679–687, 361/724–727; 248/917–924; 345/905, 169; 348/794; 381/152, 162

(56) References Cited

U.S. PATENT DOCUMENTS 6,111,755 A * 8/2000 Park ........................... 361/727
6,353,529 B1 * 3/2002 Cies ........................... 361/681
2004/0080665 A1 * 4/2004 Lovell ........................ 348/373
2005/0002537 A1 * 1/2005 Azima et al. ............... 381/152

* cited by examiner

Primary Examiner—Hung Van Duong
(74) Attorney, Agent, or Firm—Troxell Law Office, PL

(57) ABSTRACT

A modular audio-visual device comprises of a first or a second supporting element connected to a traffic means for supporting other elements, an audio-visual device sustaining element, a display device sustaining element, and a plurality of sets of fixing elements for fixing supporting element and sustaining element. The characteristic of the present invention is that the component elements can be assembled into a module for diversified use or kept alone for simple use. The device according to the present invention can be used in various traffic means. The user can freely choose and buy component elements to assemble into a device with only display function, or with only audio-visual function, or with both display and audio-visual functions. The present invention has the advantages of diversified selection and convenience for user.

15 Claims, 13 Drawing Sheets

US 6,934,149 B2

MODULAR AUDIO-VISUAL DEVICE

FIELD OF THE INVENTION

The present invention relates to a modular audio-visual device, and particularly to a modular audio-visual device of which component elements can be assembled into a module for diversified use or kept alone for simple use in various traffic means.

BACKGROUND OF THE INVENTION

It is an important part for modern life to go to work, come off duty, travel, or travel on official business by traffic means. On an average each person spends about two hours in traffic means each day, and the greater part of traveling inside or outside the country is spent in traffic process. Most people may read books, newspapers and magazines, listen to music or watch videotapes in the time of traffic process.

Reading books, newspapers or magazines in traffic means can easily make readers uncomfortable; the people therefore prefer audio listening or video watching. Moreover, the development in audio and video products and the competition in traffic means market promote the tendency of audio listening and video watching in traffic means.

In this situation, some businessmen in this field put forward an elongated audio-visual device with a leading end and a trailing end, as disclosed in U.S. Pat. No. 5,775,762. This prior art provided with a screen at front end and a disc player at the rear end for watching and providing audio-visual data. The user can freely select and display the audio-visual content he likes by controlling the control elements of screen and audio-visual device.

However, because the space in the traffic means like cars is limited and the elongated audio-visual device with front and rear end occupied rather large space, the movement and the vision field of the passengers are largely limited. Moreover, the audio-visual device has become a standard equipment of cars due to the competition in car market today, so this kind of audio-visual device is indeed a waste in resources.

Additionally, some businessmen put forward a display device with only screen for cars, as disclosed in the U.S. Pat. No. 5,946,055. This kind of screen has a frame joined to the car roof and is installed near the center or the rear seats of the car. The screen can turns around a rotational axis connected with the frame of the screen and can be stored in the frame. The display side of the screen faces to lower direction of the frame when the screen is stored and the display side faces to the passengers when the screen is turned round.

The kind of display device can be used for car, which has been provided with an audio-visual device and can avoid the waste in resources. However, if a car has not been provided with an audio-visual device, it cannot be provided with only a display device to enjoy the audio-visual display.

Therefore, a need exists for a modular device, which can be assembled from component elements and can improve the prior device. The present invention provides such a device.

SUMMARY OF THE INVENTION

The main object of the present invention is to provide a modular audio-visual device for various traffic means. The users can freely choose and buy component elements to assemble a device with only display function, only audio-visual function, or both display and audio-visual functions. The present invention has the advantages of diversified selection in use and convenience for assembling.

To achieve the said object, the present invention includes a first and a second supporting elements, an audio-visual device sustaining element, a display sustaining element and a plurality of sets of fixing elements. The assembling way of the modular audio-visual display device depends on the demand of the user, and can be provided with three types: only display function, only audio-visual function, and both display and audio-visual function.

When a device with both display and audio-visual functions is selected by user, its component elements are: the first supporting element with a first surface, a second surface and a plurality of open grooves, wherein the first surface is connected to the traffic means, and a plurality of locating tubes is extended downward from the second surface, the plurality of open grooves across through the first and the second surface; the audio-visual device sustaining element with a first surface, a second surface, a space for receiving the audio-visual device and a plurality of thorough holes corresponding to the plurality of locating tubes, wherein the plurality of through holes across through the first and the second surface and are penetrated by the plurality of locating tubes of the first supporting element, the space is under the second surface for receiving the audio-visual device, the first surface is connected with the second surface of the first supporting element; the display device sustaining element with a first surface, a second surface, a space for receiving the audio-visual device, and a plurality of through holes corresponding to the plurality of through holes of the audio-visual device sustaining element, wherein the plurality of through holes across through the first and the second surface, the space is under the second surface for receiving the display device, the first surface is connected with the plurality of locating tubes of the first supporting element; and a plurality of sets of fixing elements with a first set of fixing elements and a second set of fixing elements, wherein the first set of fixing elements penetrate the plurality of open grooves of the first supporting element and joined to the traffic means, the second set of fixing elements penetrate the plurality of through holes of the display device sustaining element and are joined with the plurality of locating tubes.

When a device with only audio-visual function is selected by user, its component elements are: the first supporting element with a first surface, a second surface, and a plurality of open grooves, wherein the first surface is connected with the traffic means, the plurality of open grooves across through the first and the second surface, and a plurality of locating tubes is extended out from the second surface; the audio-visual device sustaining element with a first surface, a second surface, a space for receiving the audio-visual device, and a plurality of through holes corresponding to the plurality of locating tubes, wherein the plurality of through holes across through the first and the second surface and are penetrated by the plurality of locating tubes, the space is under the second surface for receiving the audio-visual device, and the first surface is connected with the second surface of the first supporting element; and the plurality of sets of fixing elements with a first set of fixing elements and a second set of fixing elements, wherein the first set of fixing elements penetrate the plurality of open grooves of the first supporting element and are connected to the traffic means, the second set of fixing elements connected with the plurality of locating tubes of the first supporting element. The space of the audio-visual device sustaining element is further provided with a U-shape frame for sustaining the audio-visual device, wherein the two sides of the frame is extended upward and bended to form a connecting portion, the connecting portion is provided with a plurality of through holes and is joined with the second surface by screws penetrated the plurality of through holes.

When the user choose a device with only display function, the modular display device comprises: the second supporting element for fixing the device to the traffic means is provided with a first surface, a second surface, a plurality of open grooves and a plurality of connecting holes, wherein the first surface is connected with the traffic means and the plurality of open grooves and the plurality of connecting holes across through the first and the second surface; the display device sustaining element is provided with a first surface, a second surface, a space and a plurality of through holes corresponding to the plurality of open grooves, wherein the first surface is connected with the second surface of the second supporting element, the space is under the second surface for receiving a display device, and the through holes across through the first and the second surface; the plurality of sets of fixing elements are provided with a first set of fixing elements and a second set of fixing elements, wherein the first set of fixing elements are joined to the traffic means through the plurality of open grooves of the second supporting elements and the second set of fixing elements are joined with the plurality of the connecting holes of the second supporting elements through the through holes of the display device sustaining element.

To understand the present invention clearly, there is a preferred embodiment stated below:

DETAILED DESCRIPTION OF THE INVENTION

Figure 1:
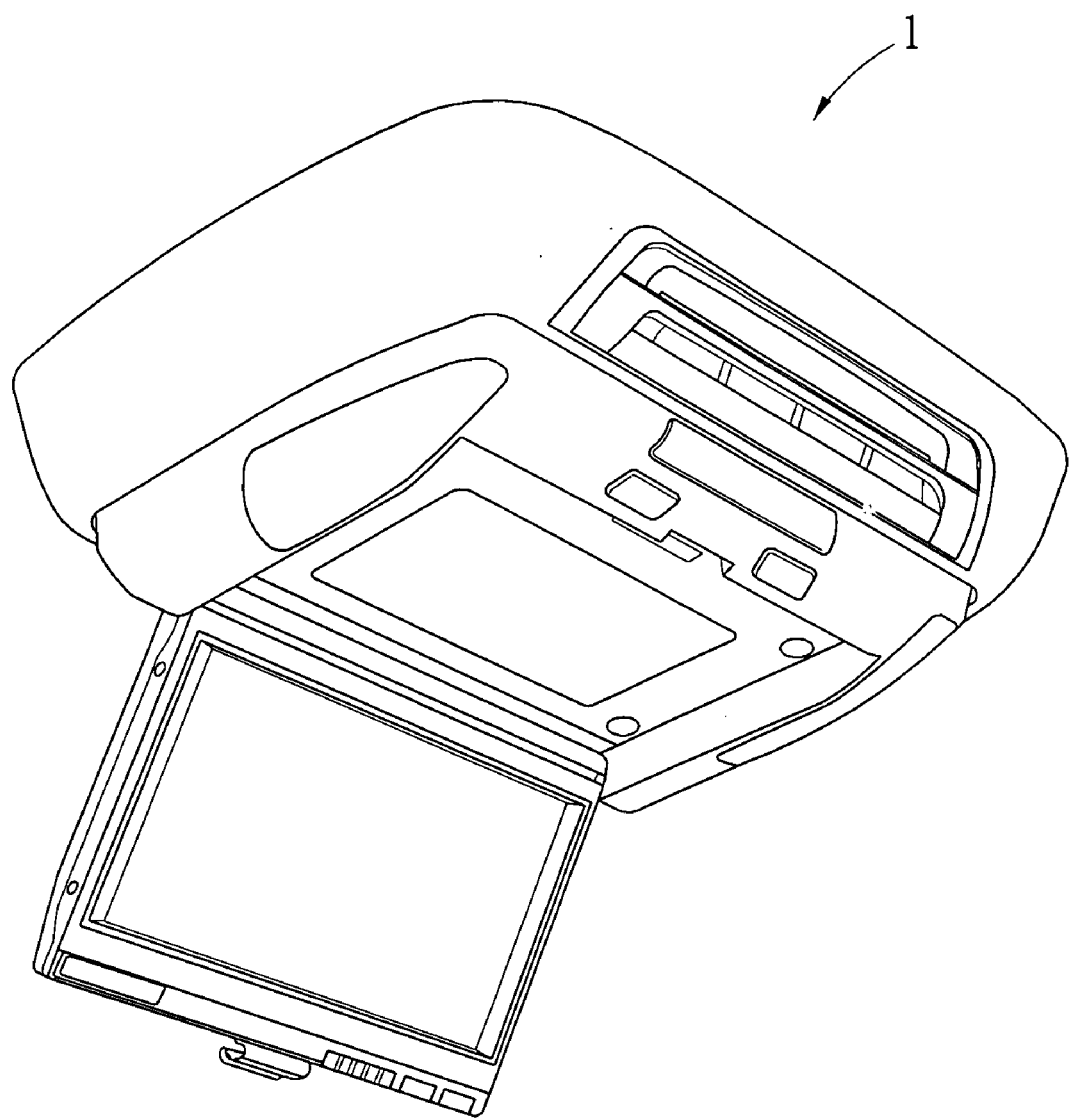
FIG. 1 is a perspective view of an embodiment according to the present invention.
Figure 2:
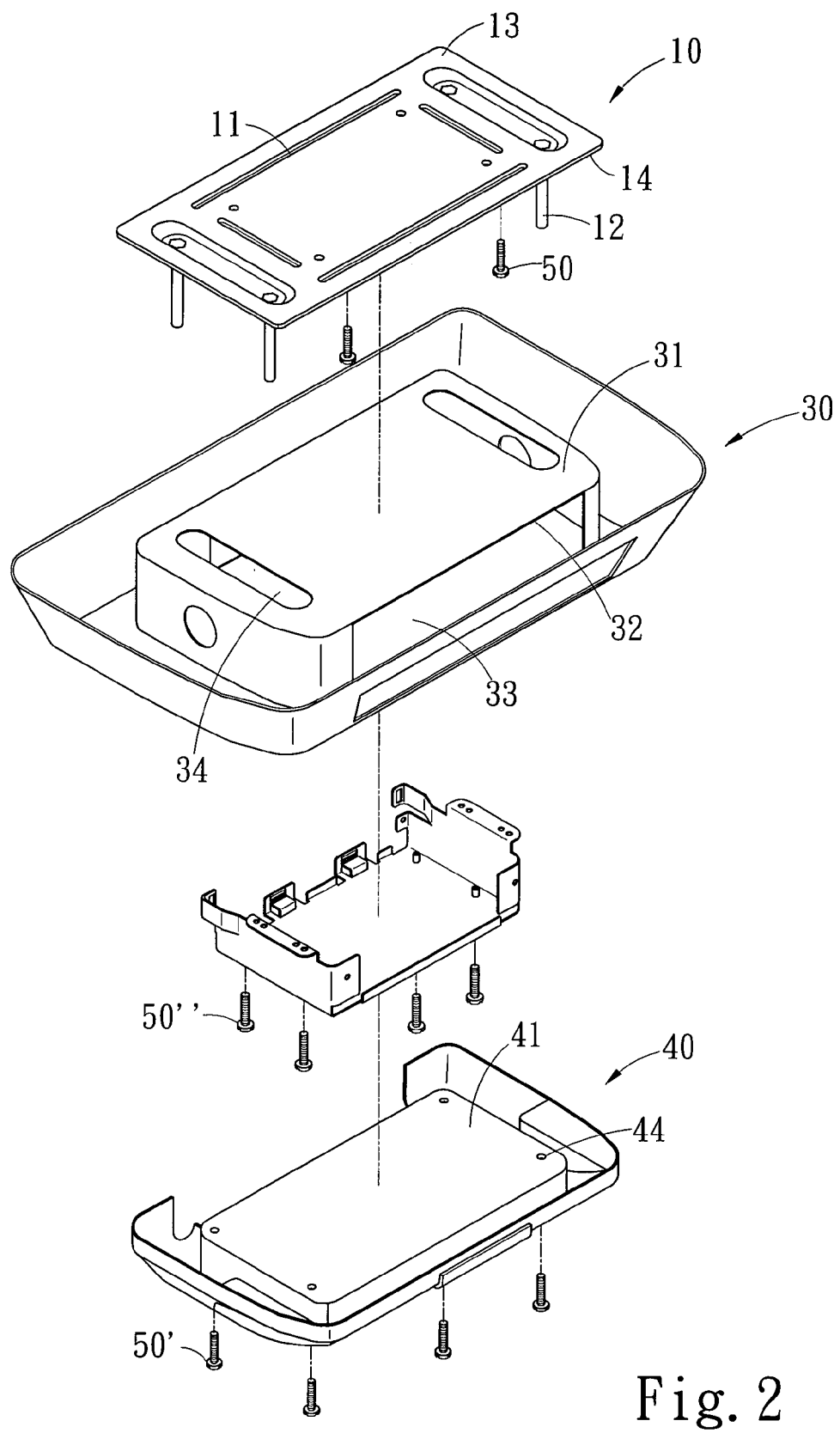
FIG. 2 is a schematic view of assembling of an embodiment according to the present invention.

As shown in FIG. 2, it is a device with both display and audio-visual functions selected. It comprises: a first supporting element 10 with a first surface 13, a second surface 14 and a plurality of open grooves 11, wherein the first surface 13 is connected to the car roof, a plurality of locating tubes 12 is extended out and provided from the second surface 14; the plurality of open grooves 11 across through the first and the second surface 13, 14; an audio-visual device sustaining element 30 with a first surface 31, a second surface 32, a space 33 and a plurality of through holes 34 corresponding to the plurality of the locating tubes 12, wherein the plurality of through holes 34 cross through the first and the second surface 31, 32, the plurality of locating tubes 12 of the first supporting element 10 penetrate the plurality of through holes 34, the space 33 is under the second surface 32 for receiving the audio-visual device, the first surface 31 joins with the second surface 14 of the first supporting element 10, the space 33 is additionally provided with a U-shape frame 35 for sustaining the audio-visual device, each of the two sides of the frame 35 is extended upward and bended to form a connecting portion 351, the connecting portion 351 is provided with a plurality of holes 352 and is joined to the second surface 32 by the screws 50" penetrated the plurality of holes 352; a display device sustaining element 40 with a first surface 41, a second surface 42, a space 43 (referring to FIGS. 9A,B) and a plurality of through holes 44 corresponding to the plurality of through holes 34 of the audio-visual device sustaining element 30, wherein the plurality of through holes 44 cross through the first and the second surface 41,42, the space 43 is under the second surface 42 for receiving the display device, the first surface 41 connects with the plurality of locating tubes 12 of the first supporting element 10; and a first set of fixing elements 50 and a second set of fixing elements 50', wherein the first set of fixing elements 50 penetrate the plurality of open grooves 21 of the first supporting element 10 and are joined to the car roof, the second set of fixing elements 50' penetrate the plurality of through holes 44 of the display device sustaining element 40 and join with the plurality of connecting tubes 12.

Figure 3:
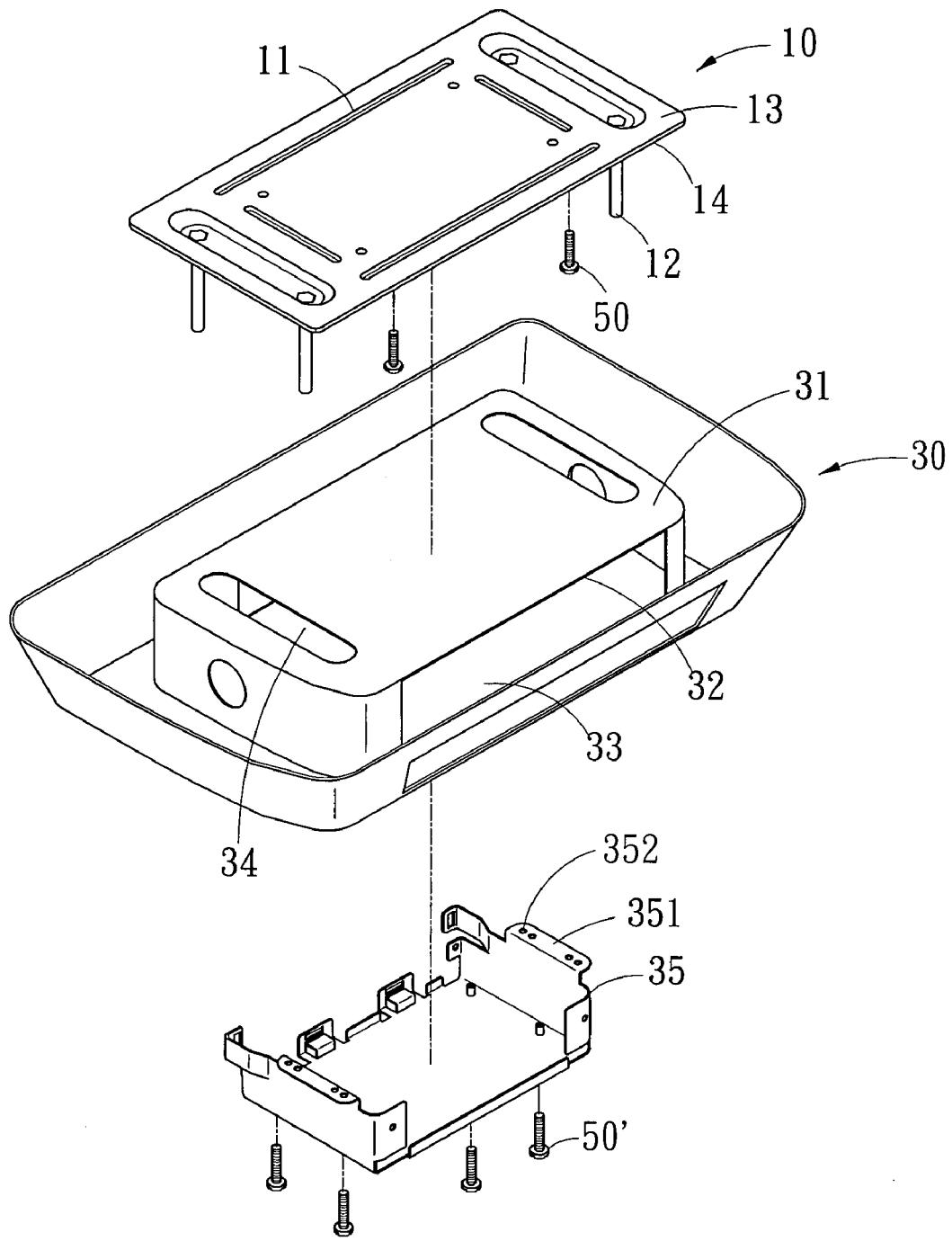
FIG. 3 is a schematic view of assembling of another embodiment according to the present invention.

As shown in FIG. 3, it is another preferred embodiment of the present invention, which possesses only audio-visual function selected by user. The device comprises: a first supporting element 10 with a first surface 13, a second surface 14 and a plurality of open grooves 11, wherein the first surface 13 is connected with the car roof (not shown), the plurality of open grooves 11 penetrate the first and the second surface 13, 14, a plurality of locating tubes 12 is extended out and provided from the second surface 14; an audio-visual device sustaining element 30 with a first surface 31, a second surface 32, a space 33 and a plurality of through holes 34 corresponding to the plurality of locating tubes 12, wherein the through holes 34 across through the first and the second surface 31,32, the plurality of locating tubes 12 penetrate the through holes 34, the space 33 is under the second surface 32 for receiving the audio-visual device, and the first surface 31 connects with the second surface 14 of the first supporting element 10, the space 33 is additionally provided with a U-shape frame 35 for sustaining the audio-visual device, each of the two side of the frame 35 is extended upward and bended to form a connecting portion 351, the connecting portion 351 is provided with a plurality of holes 352 and is joined to the second surface 32 by screws 50" penetrated the holes 352; and a first set of fixing elements 50 penetrate the plurality of the open grooves 11 of the first supporting element 10 and join to the car roof, a second set of fixing element 50' join with the plurality of the locating tubes 12 of the first supporting element 10.

Figure 4:
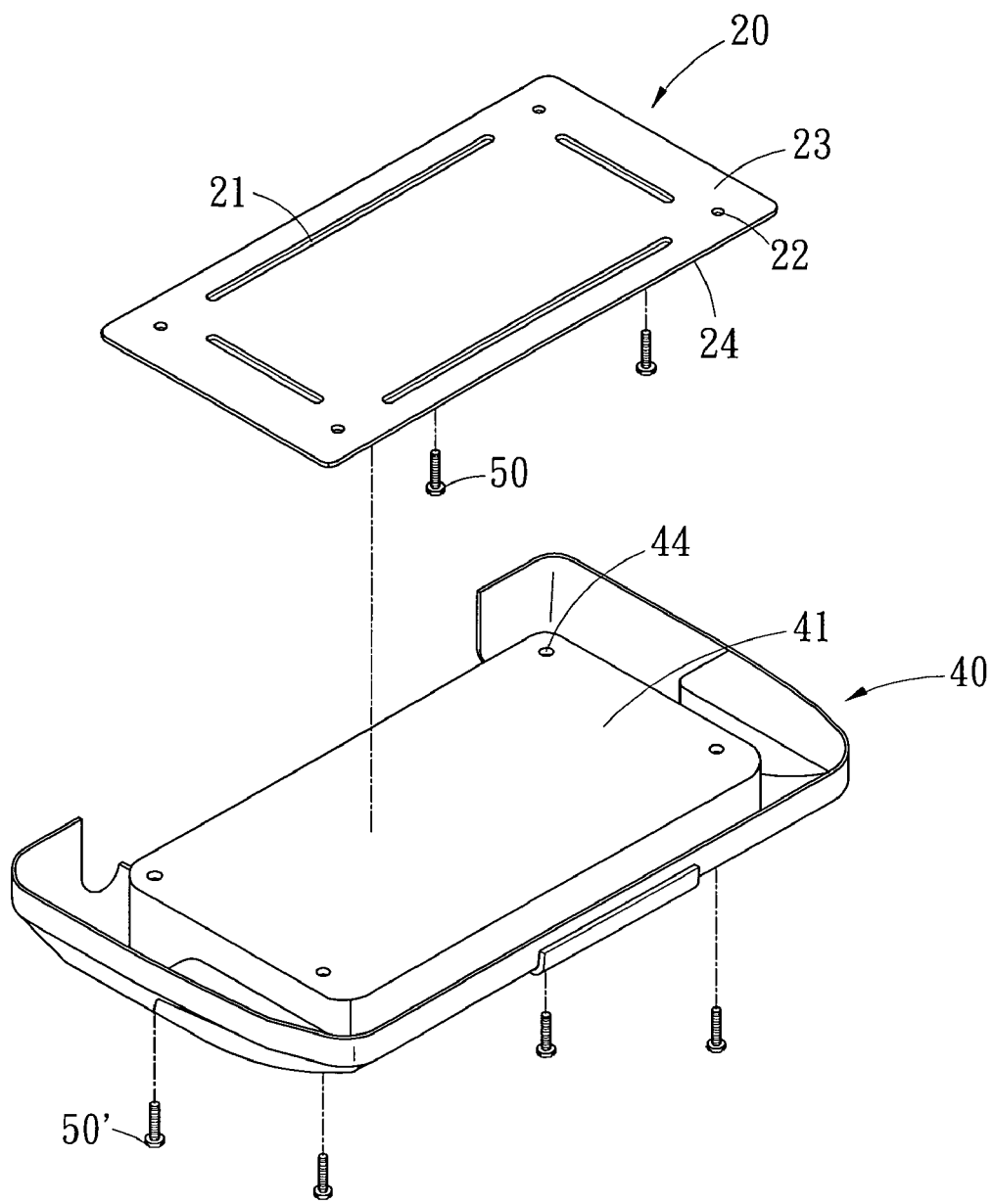
FIG. 4 is a schematic view of assembling of a yet another embodiment according to the present invention.
Figure 5:
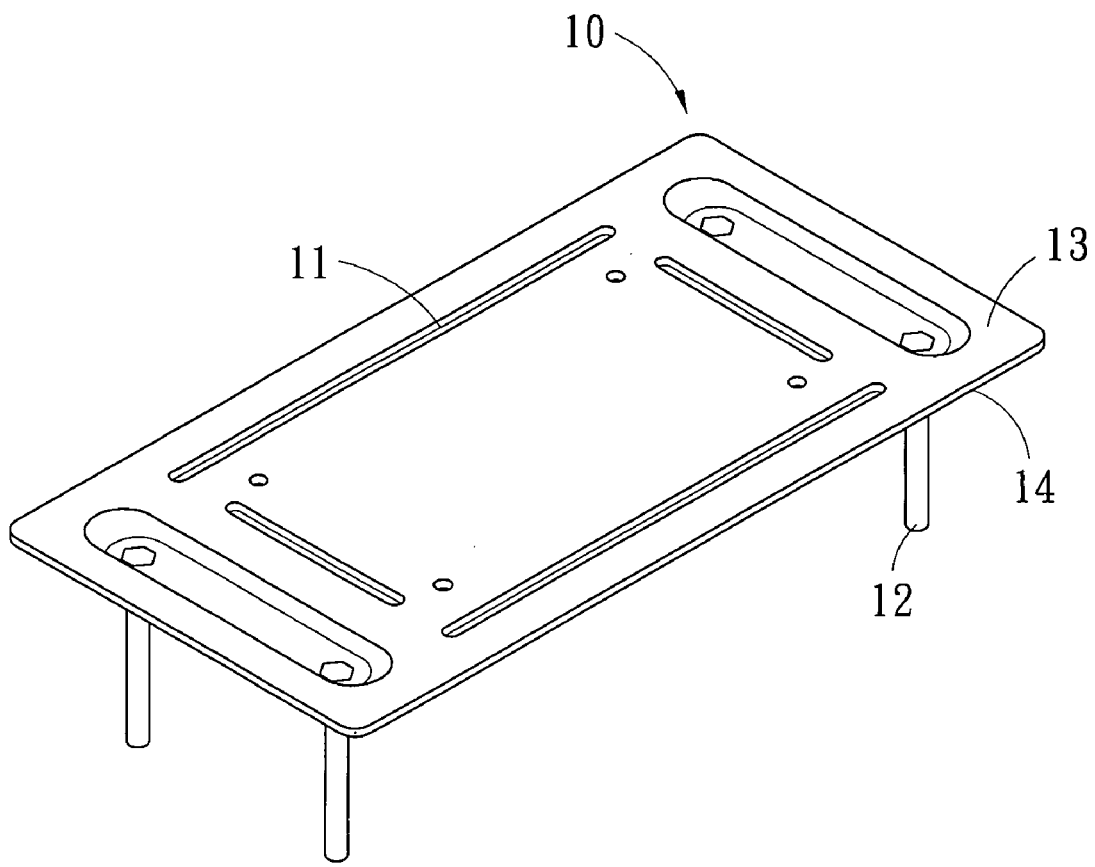
FIG. 5 is a perspective view of a first supporting element according to the present invention.
Figure 6:
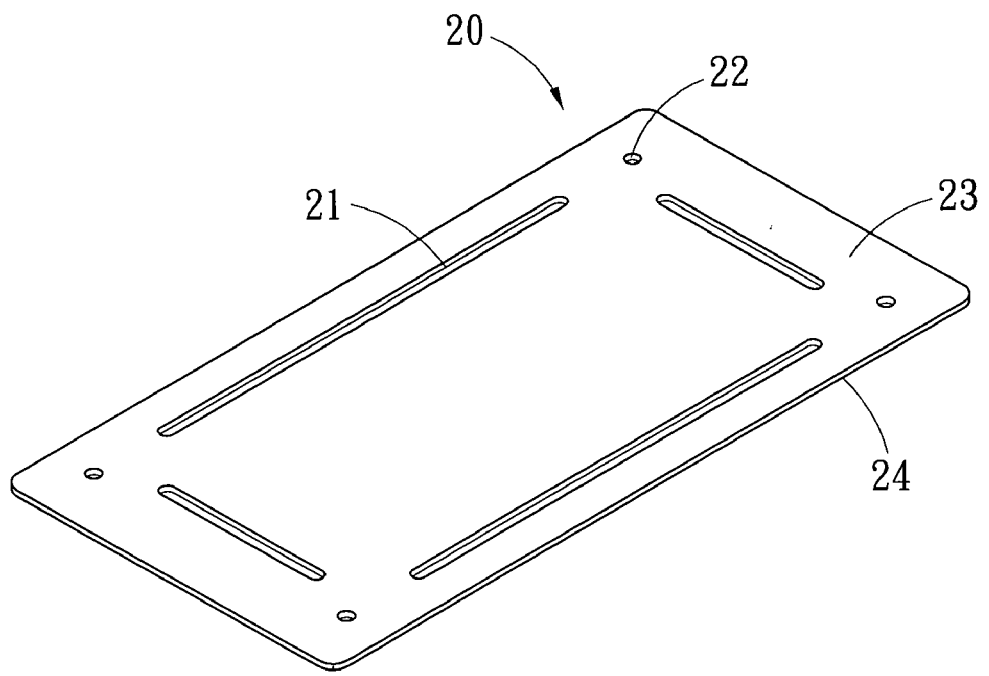
FIG. 6 is a perspective view of a second supporting element according to the present invention.
Figure 7:
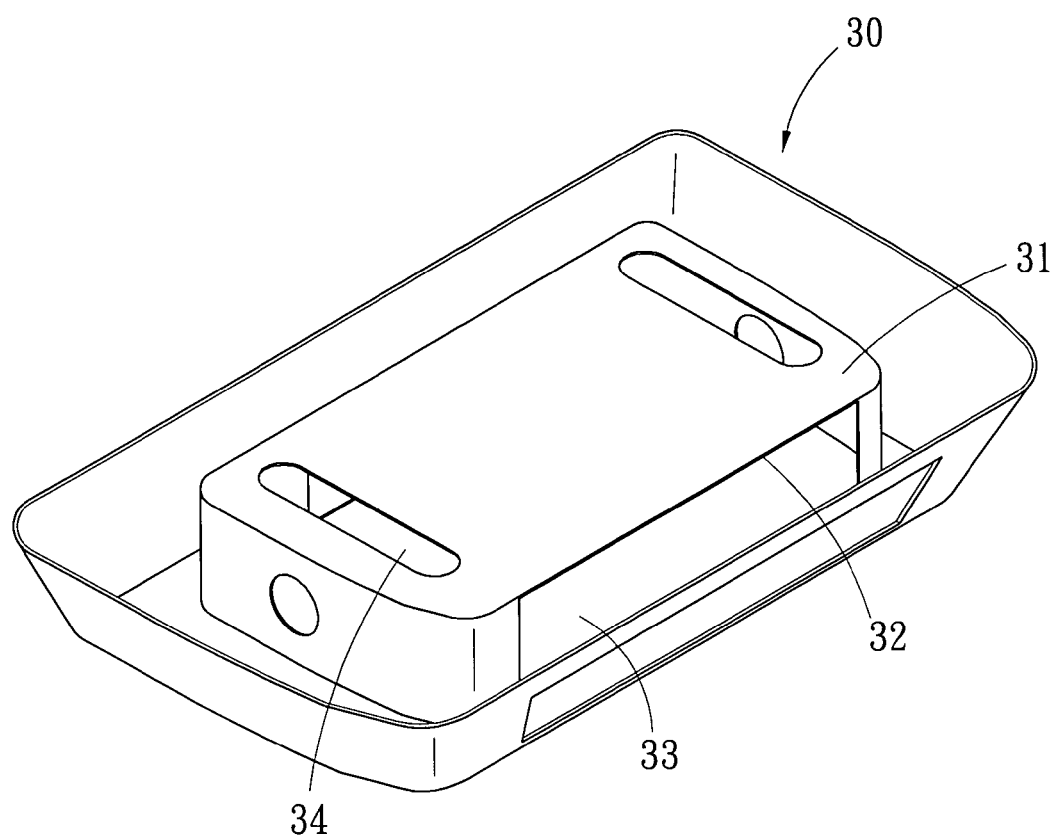
FIG. 7 is a perspective view of a sustaining element of the audio-visual device according to the present invention.
Figure 8:
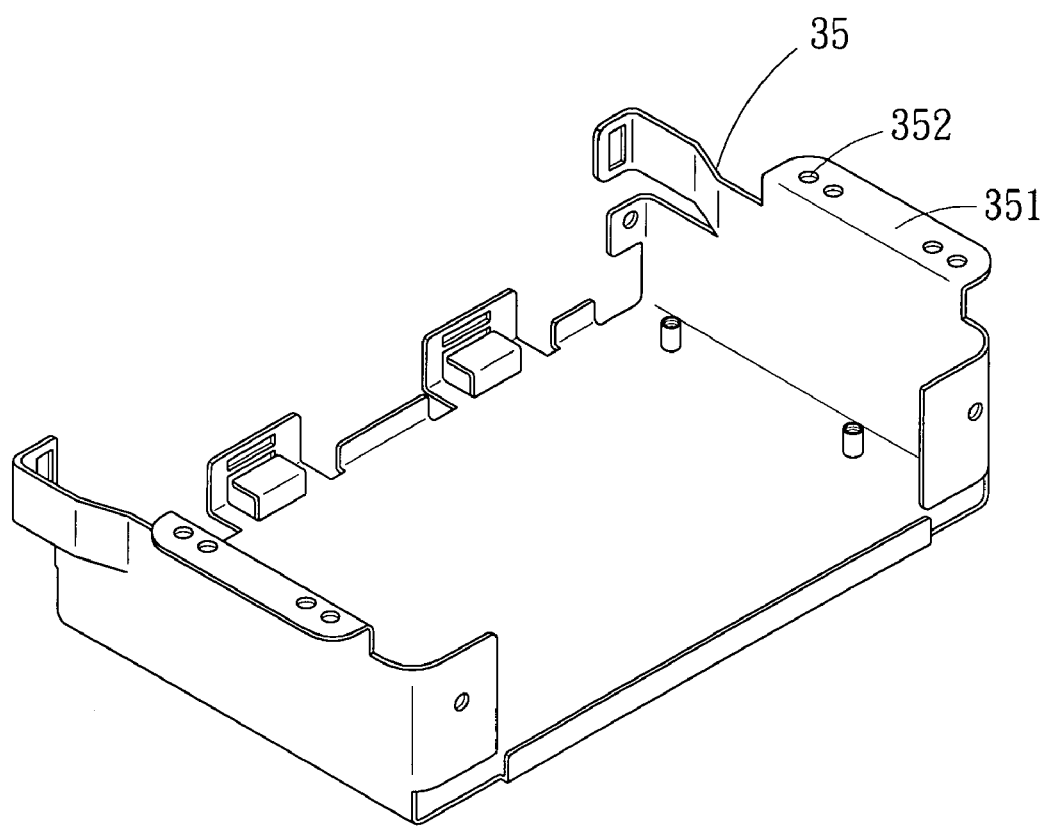
FIG. 8 is a perspective view of a frame according to the present invention.
Figure 9A:
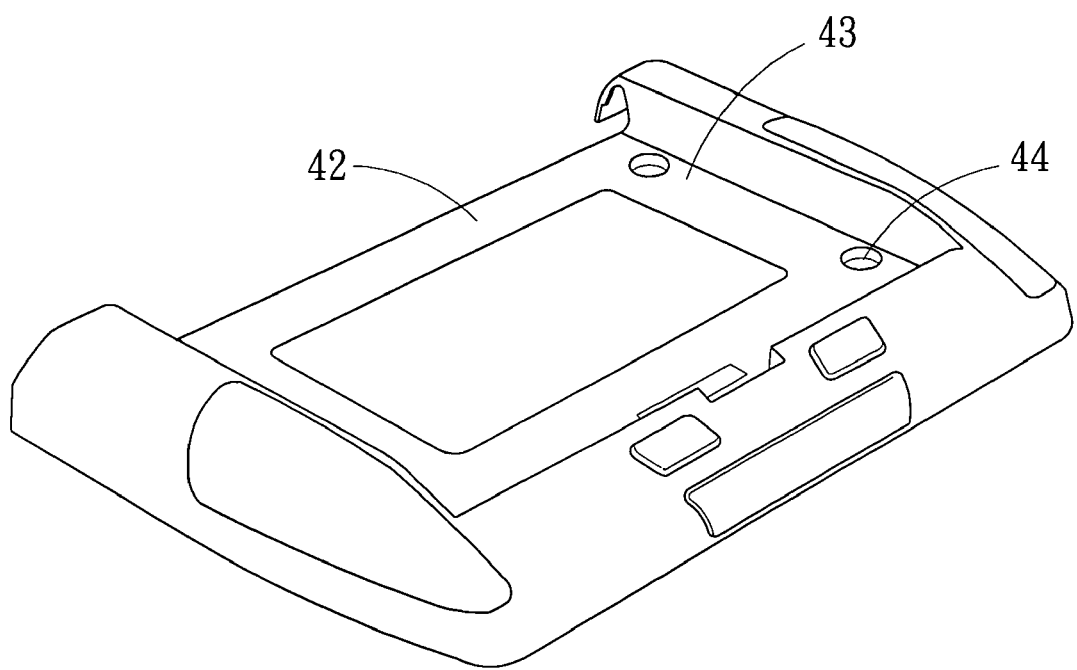
FIG. 9A is a front perspective view of a display device sustaining element inverted according to the present invention.
Figure 9B:
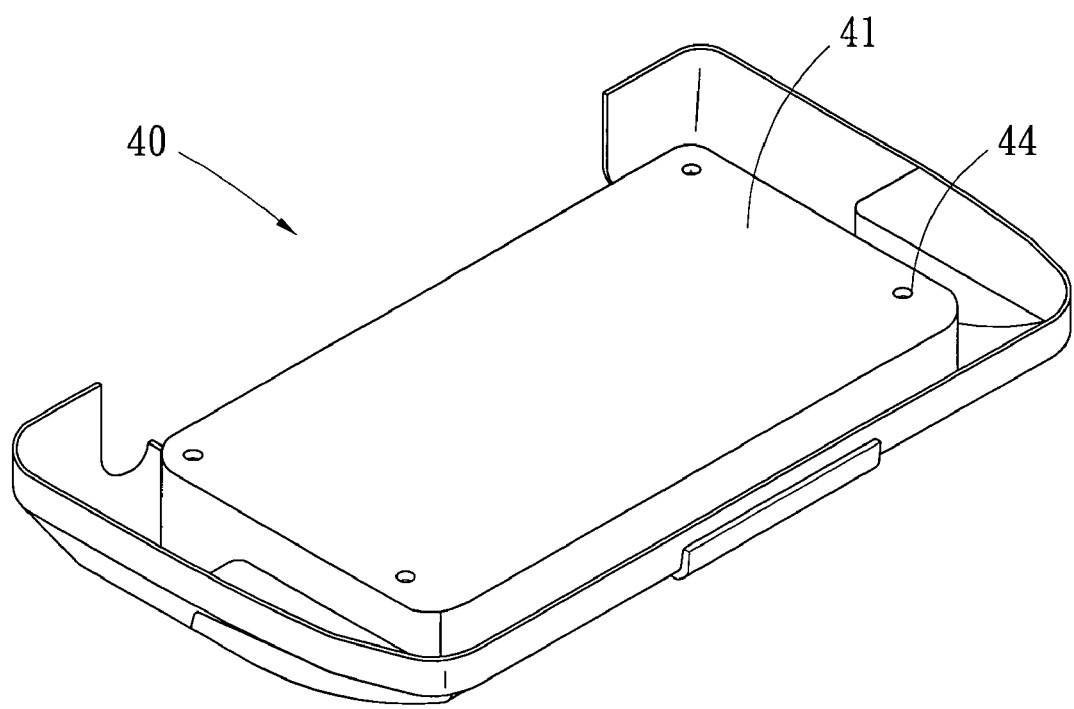
FIG. 9B is a rear perspective view of a display device sustaining element according to the present invention.
Figure 10:
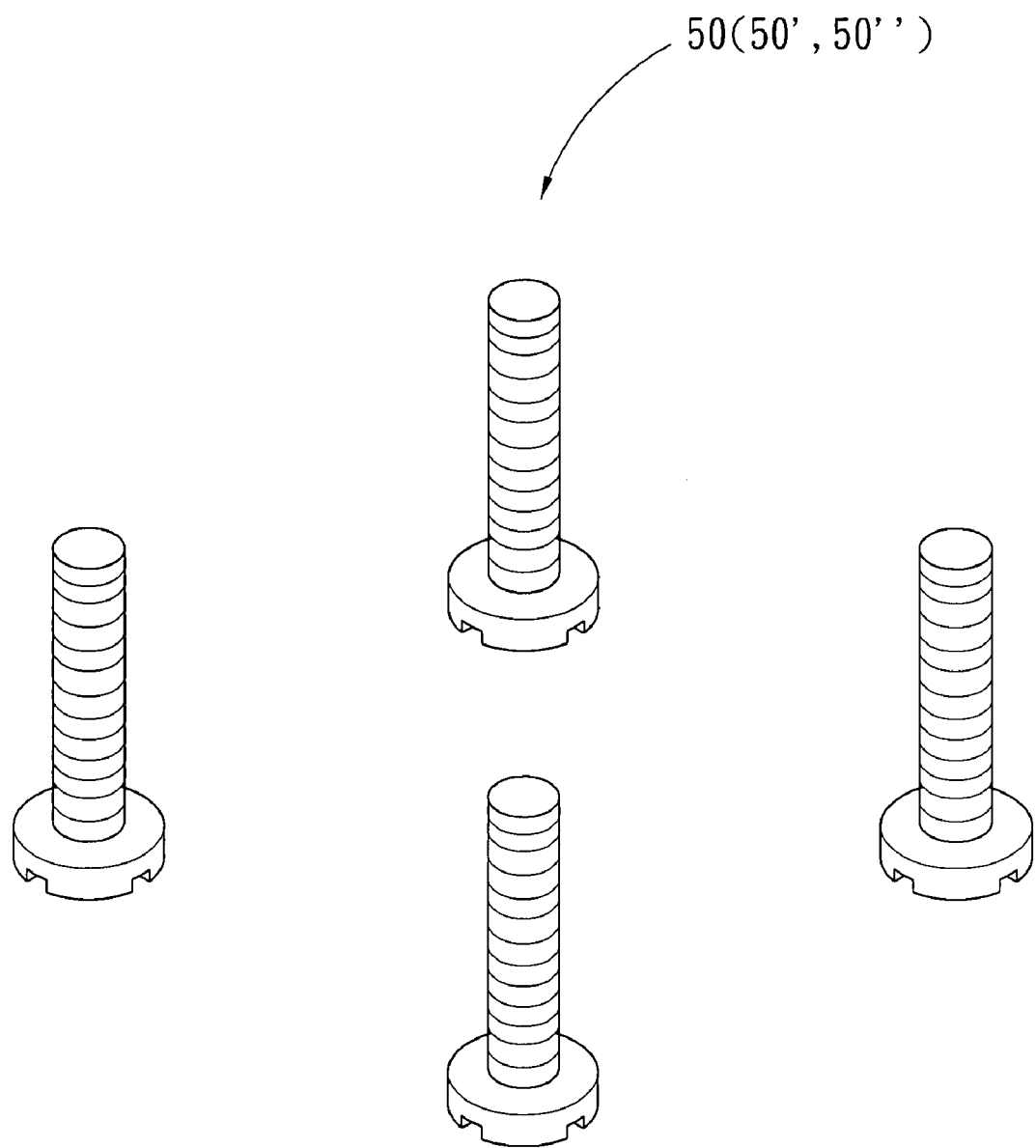
FIG. 10 is a perspective view of the fixing elements according to the present invention.
Figure 11:
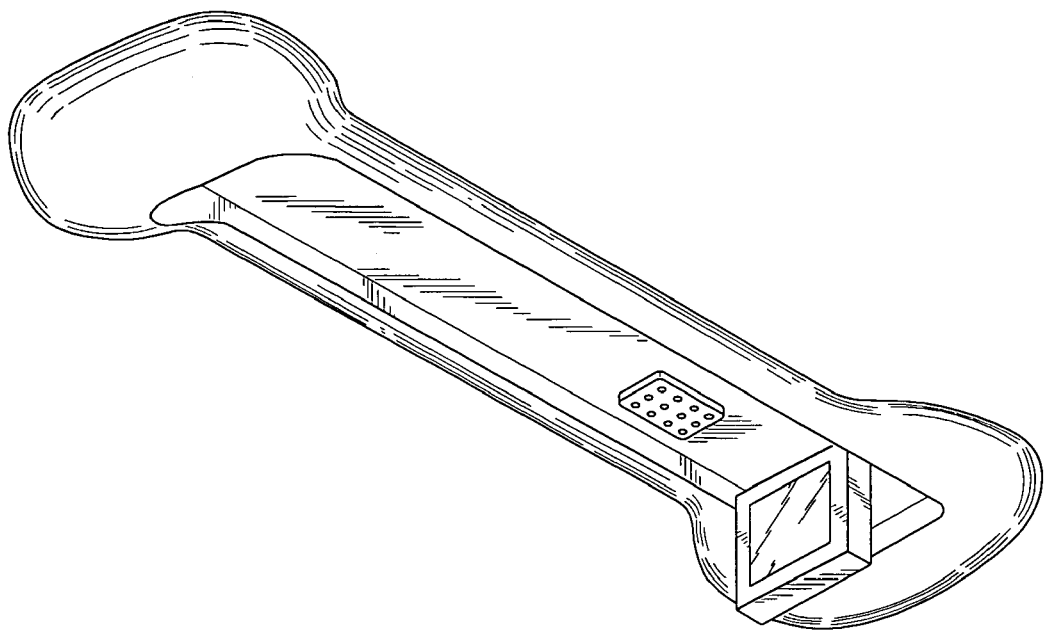
FIG. 11 is a perspective view of a prior device.
Figure 12:
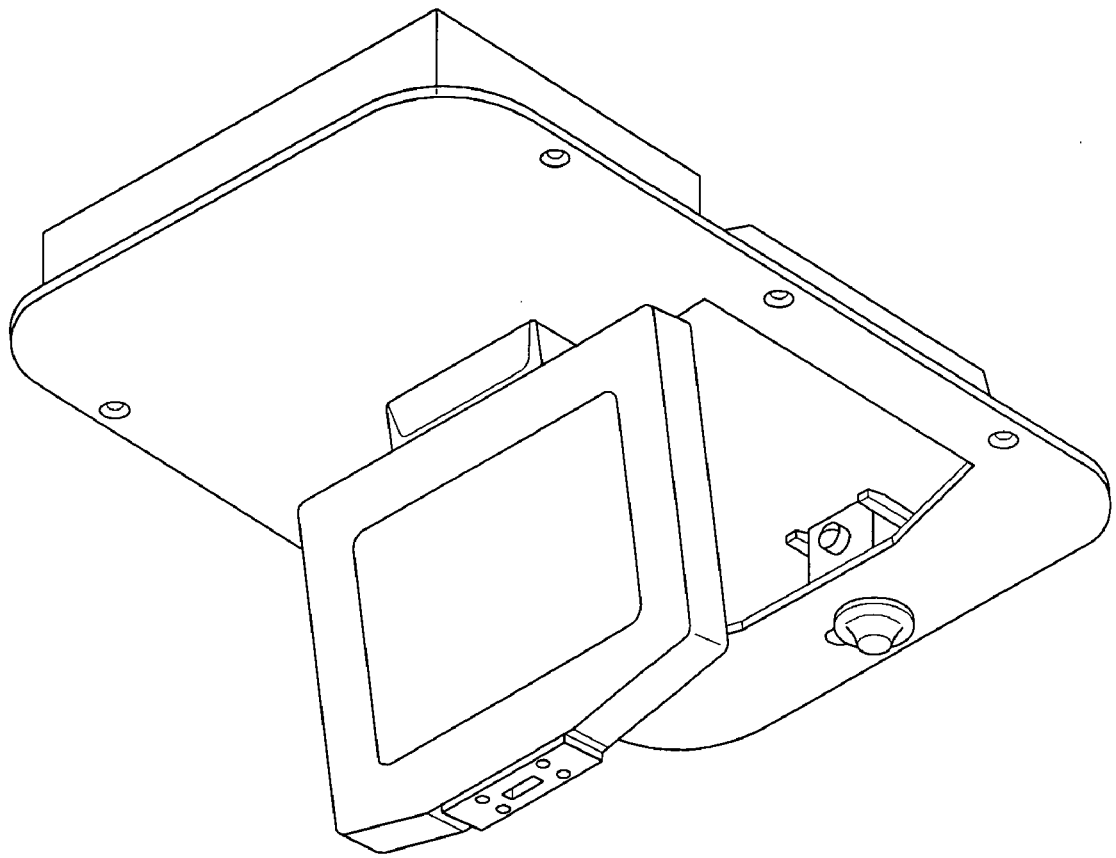
FIG. 12 is a perspective view of another prior device.

As shown in FIGS. 4, 9A and 9B, a preferred embodiment of the present invention is a modular device with only displaying function selected by user. A second supporting element 20 for connecting device to the car roof (not shown)

has a first surface 23, a second surface 24, open grooves 21 and connecting holes 22, wherein the first surface 23 is connected with the car roof, the open grooves 21 and the connecting holes 22 across the first and the second surface 23, 24. The display device sustaining element 40 has a first surface 41, a second surface 42, a space 43 and a plurality of through holes 44, wherein the space 43 is under the second surface 42 and used for receiving the display device, the plurality of through holes 44 are corresponding with the connecting holes 22 and across through the first and the second surface 41, 42, the first surface 41 is connected with the second surface 24 of the second supporting element 20. Moreover, there are a first set of fixing elements 50, which penetrate the open grooves 21 of the second supporting element 20 and join to the car roof, and a second set of fixing elements 50', which penetrate the through holes 44 of the display device sustaining element 40 and join with the connecting holes 22 of the second supporting element 20.

As stated above, the present invention has following advantages:
1. The device according to the present invention is compact. The area occupied by the device within the space of the front and the rear seat.
2. The structure of the modular audio-visual device according to the present invention is simple. The user can easily assemble the device.
3. The modular audio-visual device according to the present invention has diversified assemblage. The user can freely select, buy, and assemble a device with only display function, only audio-visual function, or both display and audio-visual functions. If a car has already an audio-visual device, it can be only provided with a display device; if a car does not have such devices, it can be provided with both display device and audio-visual device, depending on the users' selection.

As stated above, the present invention indeed can achieve its objects. The present invention provides a modular audio-visual device, which can be freely selected and assembled into diversified combinations used for various traffic means. The present invention has the utilization value in industry, so it is brought forward for claiming patent right.

What is claimed is:
1. A modular audio-visual device for traffic means comprising:
   a first supporting element with a first surface, a second surface and a plurality of open grooves, the first surface connected to a traffic means, a plurality of locating tubes extended downward from the second surface, the plurality of open grooves across through the first and the second surface;
   an audio-visual device sustaining element with a first surface, a second surface, a space for receiving audio-visual device, and a plurality of through holes corresponding to the plurality of locating tubes, the plurality of through holes across through the first surface and the second surface, the plurality of locating tubes of the first supporting element penetrating through the plurality of through holes, the space being under the second surface, the first surface connected with the second surface of the supporting element;
   a display device sustaining element with a first surface and a second surface, a space for receiving display device, and a plurality of through holes corresponding to the plurality of through holes of the audio-visual device sustaining element, the plurality of through holes across through the first and the second surface, the first surface connected with the plurality of locating tubes of the first supporting element, the space being under the second surface for receiving the display device; and
   a plurality of sets of fixing elements including a first set of fixing elements and a second set of fixing elements, the first set of fixing elements penetrated the plurality of open grooves of the first supporting element and joined to the traffic means, the second set of fixing elements penetrated the plurality of through holes of the display device sustaining element and joined with the plurality of locating tubes.

2. A modular audio-visual device as claimed in claim 1, wherein said traffic means includes vehicles, vessels, and aircrafts.

3. A modular audio-visual device as claimed in claim 1, wherein said first supporting element is a plate.

4. A modular audio-visual device as claimed in claim 1, wherein said space of the audio-visual device sustaining element is further provided with an U-shape frame for sustaining an audio-visual device, each of the two sides of the frame is extended upward and bended to form a connecting portion with a plurality of holes, the connecting portion is joined to the second surface of the audio-visual device sustaining element by screws.

5. A modular audio-visual device as clamed in claim 1, wherein said fixing elements are screws.

6. A modular audio-visual device for traffic means comprising:
   a first supporting element with a first surface, a second surface and a plurality of open grooves, the first surface connected to a traffic means, a plurality of locating tubes extended downward from the second surface, the plurality of open grooves across through the first and the second surface;
   an audio-visual device sustaining element with a first surface, a second surface, a space for receiving an audio-visual device and a plurality of through holes corresponding to the plurality of locating tubes, the plurality of through holes across through the first and the second surface and being penetrated by the plurality of locating tubes, the space being under the second surface for receiving a audio-visual device, the first surface connected with the second surface of the first supporting element; and
   a plurality of sets of fixing elements including a first set of fixing elements and a second set of fixing elements, the first set of fixing elements penetrated the plurality of open grooves of the first supporting element and joined to the traffic means, the second set of fixing elements joined with the plurality of locating tubes of the first supporting element.

7. A modular audio-visual device as claimed in claim 6, wherein said space of the audio-visual device sustaining element is further provided with an U-shape frame for sustaining an audio-visual device, each of the two sides of the frame is extended upward and bended to form a connecting portion with a plurality of through holes, the connecting portion joined to the second surface by screws.

8. A modular audio-visual device as claimed in claim 6, wherein there is a display device sustaining element between the audio-visual device sustaining element and the fixing elements, the display device sustaining element provided with a first surface, a second surface, a space for receiving a display device, and a plurality of through holes corresponding to the plurality of through holes of the audio-visual device sustaining element, the first surface connected with the plurality of locating tubes of the first supporting element, the space being under the second surface for receiving a display device, the plurality of through holes across through the first and the second surface, the second set of fixing elements joined with the plurality of locating tubes of the first supporting element through the plurality of through holes of the display device sustaining element.

9. A modular audio-visual device as claimed in claim 6, wherein said traffic means includes vehicles, vessels, and aircrafts.

10. A modular audio-visual device as claimed in claim 6, wherein said first supporting element is a plate.

11. A modular audio-visual device as claimed in claim 6, wherein said fixing elements are screws.

12. A modular audio-visual device comprising:
- a second supporting element for connecting to a traffic means, it being provided with a first surface, a second surface, a plurality of open grooves and a plurality of connecting holes, the first surface connected with the traffic means, the plurality of open grooves and the plurality connecting holes across through the first and the second surface;
- a display device sustaining element provided with a first surface, a second surface, a space for receiving a display device and a plurality of through holes corresponding to the plurality of connecting holes, the through holes across through the first and the second surface, the space being under the second surface, the first surface connected with the second surface of the second supporting element; and
- a plurality of sets of fixing elements including a first set of fixing elements and a second set of fixing elements, the first set of fixing elements joined to the traffic means through the open grooves of the second supporting element, the second set of fixing elements joined with the connecting holes of the second supporting element penetrated through the through holes of the display device sustaining element.

13. A modular audio-visual device as claimed in claim 12, wherein said traffic means includes vehicles, vessels and aircrafts.

14. A modular audio-visual device as claimed in claim 12, wherein said second supporting element is a plate.

15. A modular audio-visual device as claimed in claim 12, wherein said fixing elements are screws.

* * * * *